(12) United States Patent  (10) Patent No.: US 8,487,455 B2
Trinkner  (45) Date of Patent: Jul. 16, 2013

(54) WELDING POWER GENERATOR HAVING VERTICAL SHAFT ARRANGEMENT

(75) Inventor: Mike Trinkner, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1814 days.

(21) Appl. No.: 11/581,680

(22) Filed: Oct. 16, 2006

(65) Prior Publication Data

US 2008/0087655 A1 Apr. 17, 2008

(51) Int. Cl.
*H05B 7/11* (2006.01)
*F02B 63/04* (2006.01)

(52) U.S. Cl.
USPC ........... 290/1 A; 219/133; 219/137 PS; 123/2

(58) Field of Classification Search
USPC ...................... 219/133; 123/196 W
See application file for complete search history.

(56) References Cited

U.S. PATENT DOCUMENTS

| 4,072,872 | A | * | 2/1978 | Gleichman | 310/53 |
| 5,861,604 | A | * | 1/1999 | McLean et al. | 219/130.5 |
| 6,040,555 | A | * | 3/2000 | Tiller et al. | 219/132 |
| 6,924,460 | B1 | * | 8/2005 | Stava | 219/133 |
| 2005/0264014 | A1 | * | 12/2005 | Brandenburg et al. | 290/1 A |

* cited by examiner

*Primary Examiner* — Brian Jennison
(74) *Attorney, Agent, or Firm* — Fletcher Yoder P.C.

(57) ABSTRACT

A welding generator system, in certain embodiments, has a generally vertical arrangement of a drive and a generator. The welding generator system may include a motor and a generator coupled to the motor, wherein the generator includes a rotor having an axis oriented in a generally upright direction relative to a base portion of the welding generator system. The welding generator system also may include a thrust bearing configured to support an axial load of the rotor, and a welding power system coupled to the generator.

23 Claims, 6 Drawing Sheets

WELDING POWER GENERATOR HAVING VERTICAL SHAFT ARRANGEMENT

BACKGROUND

The present invention relates generally to welding devices and, in certain embodiments, to welding power generators.

Electric welding systems typically employ an electrode and a current source to weld a workpiece. Generally, the workpiece is connected to a first lead of the current source and the electrode is connected to a second, differently charged lead of the current source. To initiate welding, the electrode is typically brought near the workpiece, and an electric arc is struck over an air gap between the electrode and the workpiece. The electric arc converts electric energy into thermal energy, which liquefies metal proximate the electrode. In some forms of welding, the electric arc also melts metal in the electrode, thereby consuming the electrode.

In some applications, a welding power generator is used to power an electric welding system at a site away from a power grid. For example, the welding power generator may be disposed in the bed of a truck. Unfortunately, the welding power generator is typically very heavy (e.g., 500 pounds) and consumes a large amount of space. In other words, the welding power generator has a large footprint, which can consume valuable space in the bed of the truck. As a result, other equipment may not fit within the bed of the truck, thereby causing the driver to omit certain items or make multiple trips to the site.

BRIEF DESCRIPTION

In certain embodiments disclosed and claimed herein, a welding generator system has a vertical arrangement to reduce a footprint of the welding generator system. The welding generator system may include a motor and a generator coupled to the motor, wherein the generator includes a rotor having an axis oriented in a generally upright direction relative to a base portion of the welding generator system. The welding generator system also may include a thrust bearing configured to support an axial load of the rotor, and a welding power system coupled to the generator.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
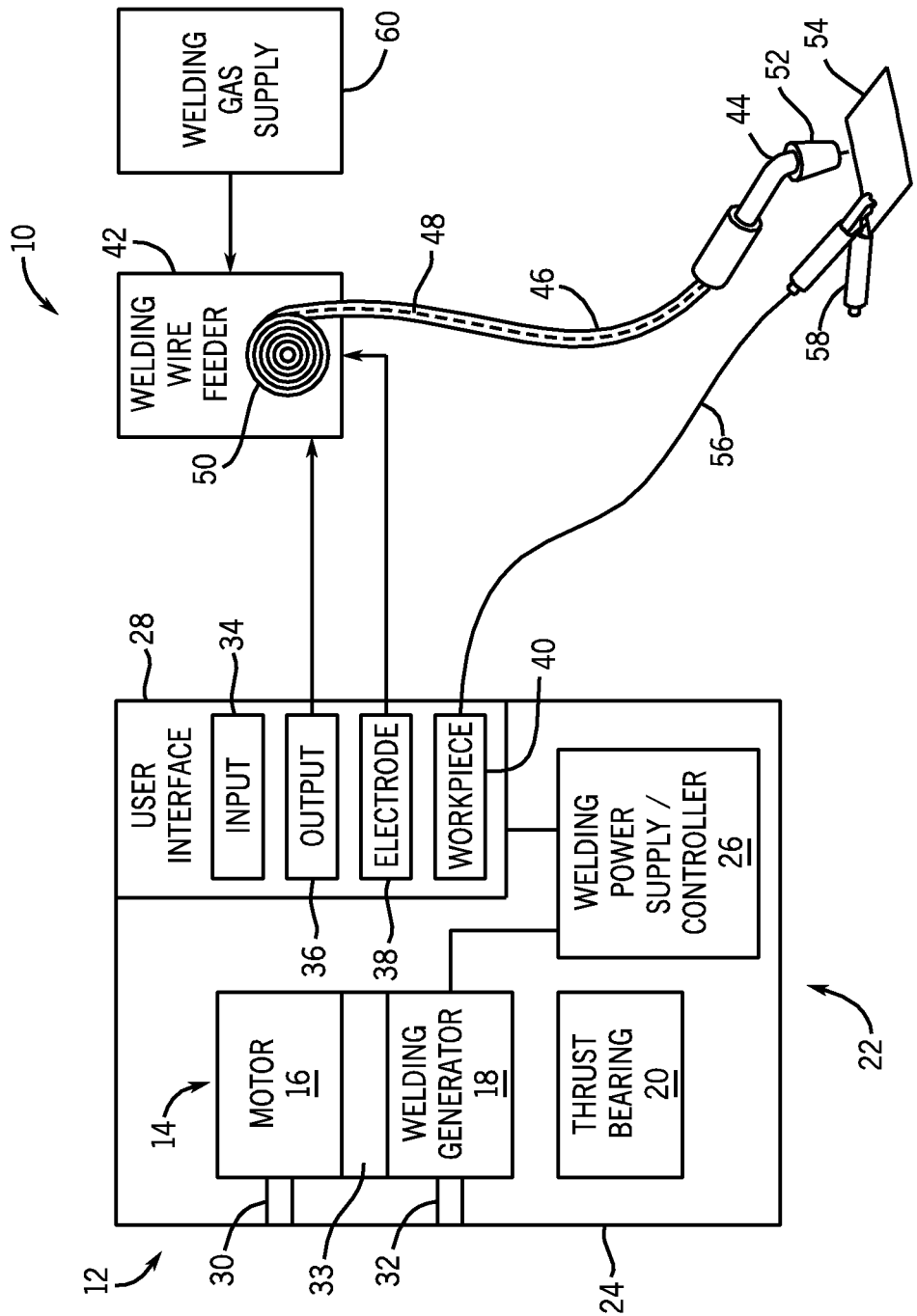
FIG. 1 is a block diagram of an exemplary embodiment of a welding system having a welding generator system with a vertically arranged motor and welding generator.

FIG. 1 is a block diagram of an exemplary embodiment of a welding system 10 having a welding generator system 12 with a vertical motor-generator configuration 14. Specifically, the welding generator system 12 includes a drive or motor 16 (e.g., an internal combustion engine), a welding generator 18, and a thrust bearing 20 disposed in the vertical motor-generator configuration 14. The vertical motor-generator configuration 14 may be described as a vertical shaft configuration, a vertically stacked arrangement, or a one over the other relationship between the motor 16, the generator 18, and the thrust bearing 20. The vertical motor-generator configuration 14 is distinctly different than a horizontal configuration of the motor 16 and the welding generator 18 side-by-side relative to one another. For example, the vertical motor-generator configuration 14 substantially reduces a footprint 22 of the welding generator system 12 relative to the footprint of a corresponding horizontally arranged welding generator system. The term vertical may be defined as a generally upright orientation relative to the footprint 22 or base of the welding generator system 12, and may allow for some deviation from a ninety degree angle. For example, the term vertical may be defined as an angle of 90 degrees ±1, 2, 3, 4, 5, 10, 15, 20, or 25 degrees relative to the footprint 22.

Unlike the horizontal configuration, the vertical configuration 14 creates a significant axial load on the rotating parts in the welding generator system 12. As discussed in detail below, the thrust bearing 20 substantially supports the axial load or weight of at least some parts of the welding generator 18. For example, the thrust bearing 20 may support the axial load of the rotor within the welding generator 18. In the illustrated embodiment, the thrust bearing 20 is generally independent from the motor 16 and is positioned on an opposite side of the welding generator 18 relative to the motor 16. For example, the thrust bearing 20 is independent from any bearings within the motor 16. Furthermore, the thrust bearing 20 may be an integral part of the welding generator 18, or part of a lower mount structure, or a combination thereof.

In the illustrated embodiment, the welding generator system 12 includes a chassis or enclosure 24, which supports the motor 16, the welding generator 18, the thrust bearing 20, a welding power supply/controller 26, and a welding input/output panel or user interface 28, among other welding components. For example, the illustrated enclosure 24 includes chassis mounts 30 and 32 coupled to the motor 16 and the welding generator 18, respectively. The welding generator 18 also includes a motor mount 33 coupled to the motor 16. In certain embodiments, the motor mount 33 may also connect with the enclosure 24, thereby providing a joint support at the interface between the motor 16 and the welding generator 18. Thus, the motor 16 and the welding generator 18 may be independently mounted to the enclosure 24 via the chassis mounts 30 and 32, or the motor 16 and the welding generator 18 may be jointly mounted to the enclosure 24 via the motor mount 33, or a combination thereof.

The illustrated welding power supply/controller 26 is coupled to the welding generator 18 and the user interface 28. In certain embodiments, the welding power supply/controller 26 includes a welding rectifier, a reactor, a stabilizer, or a combination thereof. Thus, the welding power supply/controller 26 is configured to control the output from the welding generator 18 based on the needs of a particular welding operation.

The user interface 28 includes one or more inputs 34, one or more outputs 36, a welding power output or electrode connector 38, and a work piece connector 40. For example, the inputs 34 may include knobs, switches, dials, keys, and other user input mechanisms configured to enable control of various parameters of the welding power supply/controller 26 and the overall welding system 10. For example, the inputs 34 may enable adjustment of the welding current among other things. The outputs 36 may include auxiliary power outputs, auxiliary control outputs, or combinations thereof. For example, the illustrated output 36 provides power and control signals to a welding wire feeder 42. However, some embodiments of the welding system 10 exclude the welding wire feeder 42, and the output 36 can be used to power other components.

In addition, the welding electrode connector 38 is coupled to the welding wire feeder 42, which in turn couples to a welding torch 44 via a conduit 46. For example, the output 36 may provide power and control signals to drive a motor within the welding wire feeder 42, thereby feeding welding wire 48 from a reel 50 into the conduit 46 to the welding torch 44. In addition, the welding electrode connector 38 provides a welding current through the welding wire feeder 42, through the conduit 46, and through the welding torch 44 to a torch head 52. In other embodiments, the welding electrode connector 38 may be directly coupled to the conduit 46 and/or the welding torch 44 rather than first passing through the welding wire feeder 42. Some embodiments also may eliminate the welding wire feeder 42, and the welding torch 44 may embody a stick welding torch. In fact, one specific embodiment of the welding system 10 includes only the single chassis 24 having the motor 16, the generator 18, the thrust bearing 20, the controller 26, and the interface 28 all integrated together to facilitate portability and reduced space consumption.

In either configuration, the torch head 52 may include a nozzle assembly, a contact tip, and other components configured to transmit the welding current to the welding wire 48, such that an arc may be formed between the welding wire 48 and a work piece 54. The heat produced by the electric current flowing into the work piece 54 through the arc causes the work piece 54 and the welding wire 48 to melt in the vicinity of the arc, thereby forming a weld or joint on the work piece 54. As appreciated, the welding circuit is completed by a work piece cable 56 coupled to the work piece connector 40 and the work piece 54 via a clamp 58.

The illustrated welding system 10 also includes a welding gas supply 60 coupled to the welding wire feeder 42 and, in turn, the welding torch 44 via the conduit 46. Specifically, the welding gas supply 60 is configured to flow an inert gas into the welding wire feeder 42, and then lengthwise through the conduit 46 to the welding torch 44. As appreciated, the inert gas from the welding gas supply 60 is configured to shield the weld being formed by the welding torch 44. For example, the inert gas from the welding gas supply 60 may prevent oxidation and impurities from entering and degrading the integrity of the weld. In the illustrated embodiment, the welding wire feeder 42 and the welding gas supply 60 are shown as separate components from the welding generator system 12. However, other embodiments of the welding generator system 12 may incorporate the welding wire feeder 42, the welding gas supply 60, or various other welding components into the single enclosure 24.

Figure 2:
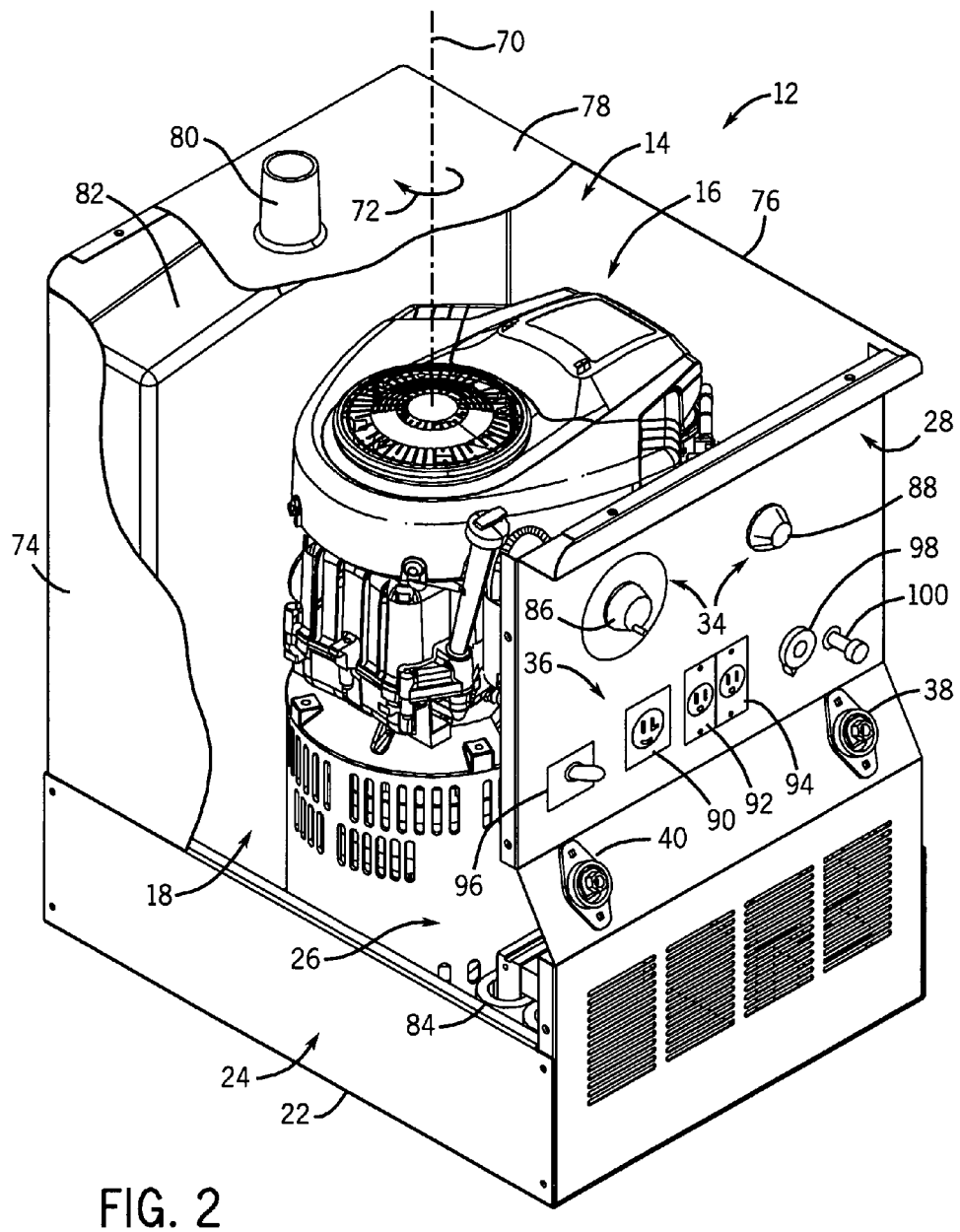
FIG. 2 is a perspective view of an embodiment of the welding generator system of FIG. 1.

FIG. 2 is a perspective view of an exemplary embodiment of the welding generator system 12 as illustrated in FIG. 1. Again, the motor 16 and the welding generator 18 are disposed one over the other in the vertical motor-generator configuration 14, such that a rotational axis 70 of both the motor 16 and the welding generator 18 is generally upright or vertical relative to the base or footprint 22. Thus, both the motor 16 and the welding generator 18 rotate about the rotational axis 70 as indicated by arrow 72. In the illustrated embodiment, the motor 16 is positioned over the welding generator 18, while other embodiments may be configured with the welding generator 18 disposed over the motor 16. In either embodiment, the thrust bearing 20 is configured to support the axial load of at least a substantial portion of the rotating components (e.g., the rotor) of the welding generator 18.

In the illustrated embodiment, the enclosure 24 includes removable access covers or panels 74, 76, and 78, which are shown partially cut away to illustrate the motor 16 and the welding generator 18 contained within the enclosure 24. Specifically, the panels 74 and 76 are disposed on opposite lateral sides of the enclosure 24, while the panel 78 is disposed over a top side of the enclosure 24. Given that the motor 16 and welding generator 18 are contained within the enclosure 24, the welding generator system 12 also includes an exhaust 80 extending through the panel 78 from a muffler 82 coupled to the motor 16. The welding power supply/controller 26 also includes a variety of components, such as a stabilizer 84, contained within the enclosure 24.

Finally, the user interface 28 includes a plurality of inputs 34, outputs 36, the welding electrode connector 38, and the work piece connector 40. Specifically, the inputs 34 include a coarse current control 86 and a fine current control 88 configured to adjust the welding current output to the welding electrode connector 38. The outputs 36 include electrical outlets 90, 92, and 94, which may include a variety of different electrical connectors, voltage levels, and current levels depending on the particular system 12. In addition, the user interface 28 includes a circuit breaker 96, an engine start switch 98, and a pull-actuated choke 100. In other embodiments, the user interface 28 may include a display screen, a keyboard, a keypad, and various other user input mechanisms and outputs.

Figure 3:
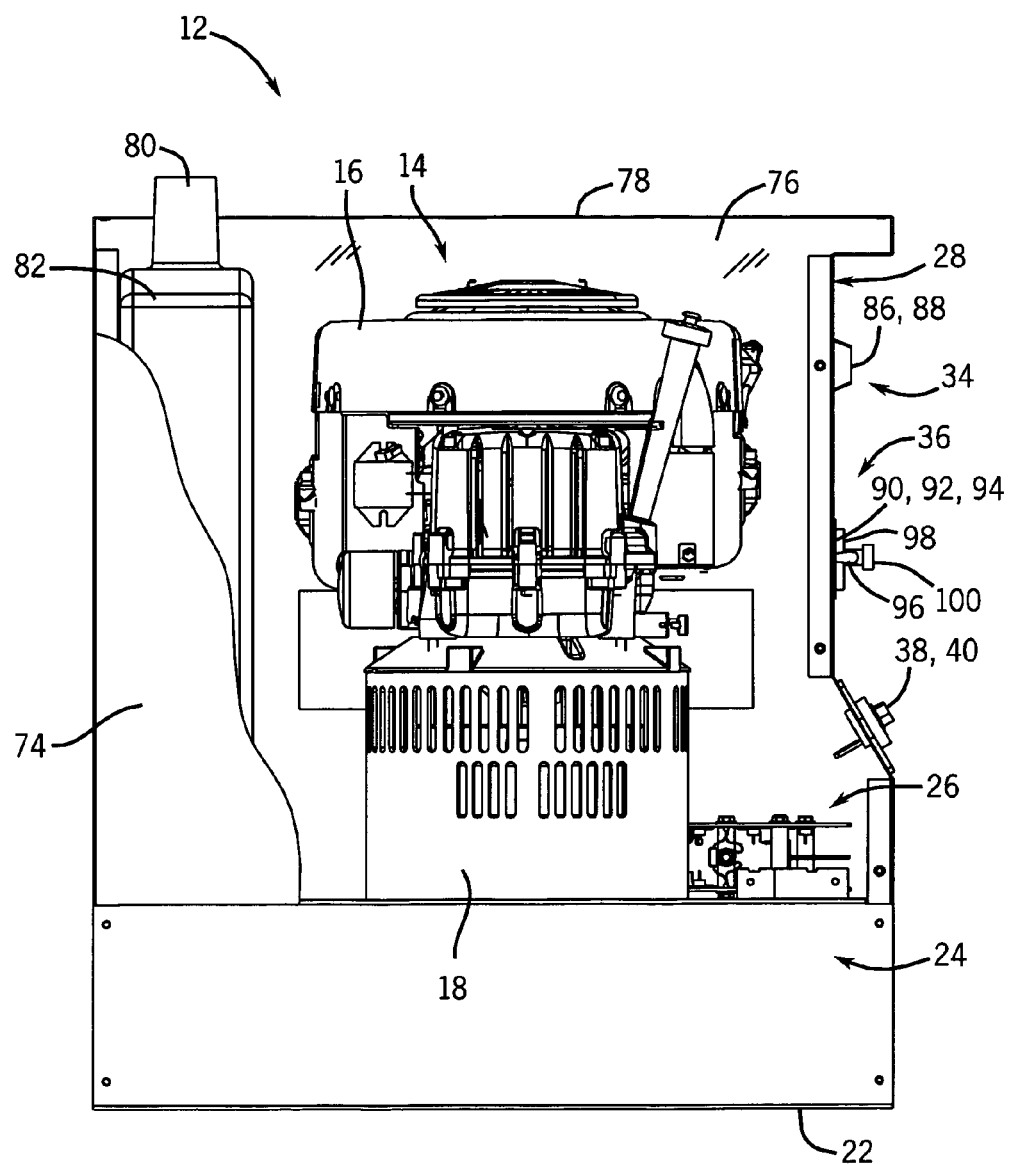
FIG. 3 is a side view of the welding generator system of FIG. 2.

FIG. 3 is a side view of the welding generator system 12 as illustrated in FIG. 2, further illustrating the vertical motor-generator configuration 14 and the corresponding footprint 22 of the welding generator system 12. As appreciated, if the motor 16 and the welding generator 18 were disposed side-by-side in a generally horizontal configuration, then the footprint 22 of the enclosure 24 would be significantly larger than the illustrated system 12. For example, the width of the enclosure 24 and the corresponding footprint 22 may be increased by 50, 60, 70, 80, 90, 100, or an even greater percentage if the motor 16 and the welding generator 18 were hypothetically rotated 90 degrees and reconfigured to rotate about a horizontal axis. Again, the dimensions (e.g., area) of the footprint 22 are greatly reduced by positioning the motor 16 and the welding generator 18 one over the other in the vertical configuration 14 as illustrated in FIG. 3. The footprint 22 may be further reduced by positioning other components in a vertical configuration with the motor 16 and the welding generator 18. For example, the muffler 82 and the controller 26 may be disposed above or below the motor 16 and the welding generator 18, thereby further reducing the footprint 22.

Figure 4:
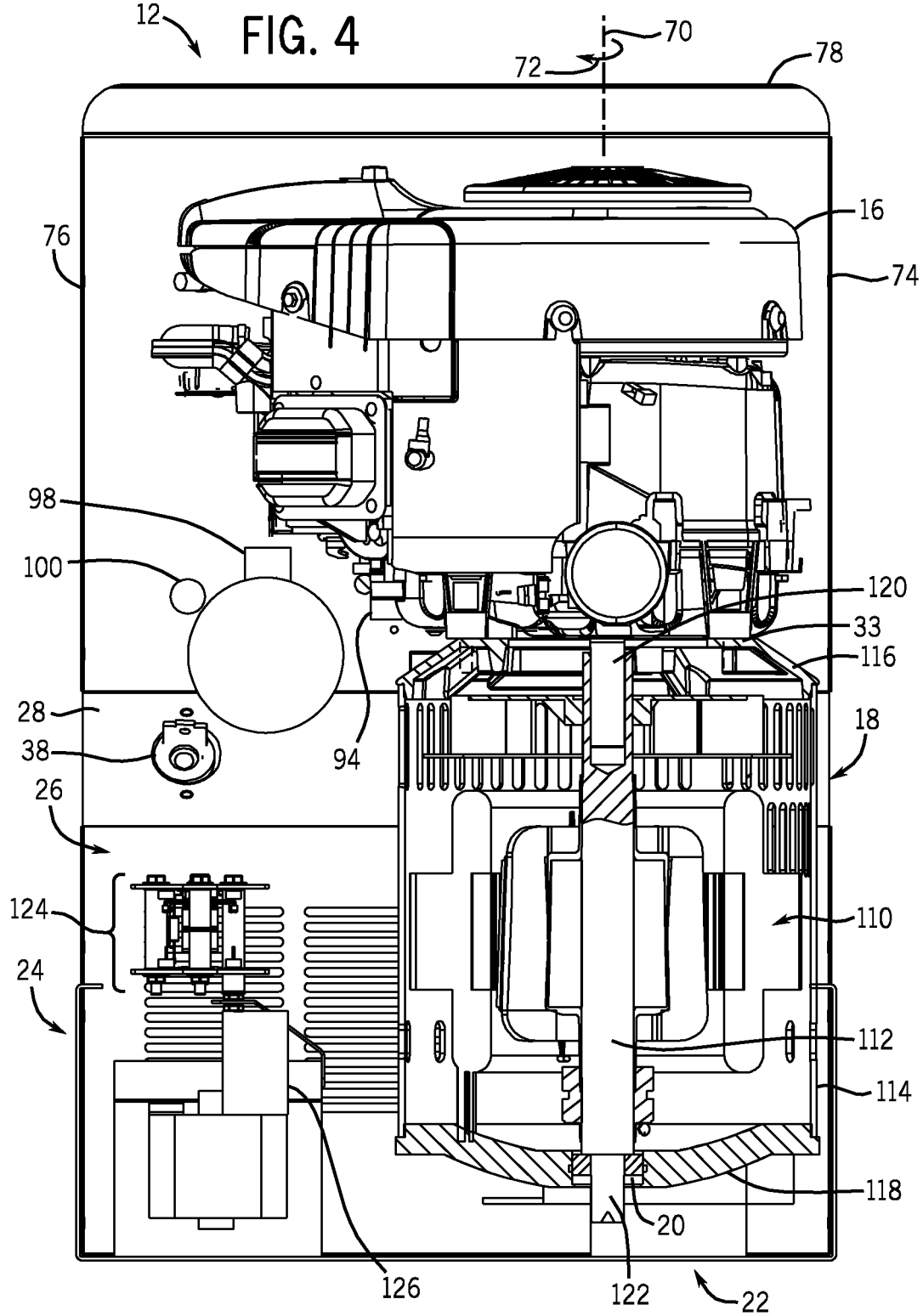
FIG. 4 is a cross sectional view of the welding generator system of FIGS. 2-3.

FIG. 4 is a cross sectional view of the welding generator system 12 as illustrated in FIGS. 2-3. In the illustrated embodiment, the motor 16 is coupled to the generator 18 at the motor mount 33. The illustrated motor 16 is an internal combustion engine, such as a 5, 10, 15, 20, 25, or other suitable horsepower internal combustion engine. The motor 16 may be powered by gasoline, propane, or another suitable fuel. The motor 16 also may include one or more piston-cylinder assemblies, a fuel injection system, an air intake manifold, an exhaust manifold, and so forth. In other embodiments, the drive or motor 16 may include a gas turbine engine, a compression ignition engine (e.g., diesel fueled engine), a hybrid fuel/electric engine, a fuel cell, or another suitable drive mechanism, or a combination thereof.

The illustrated welding generator 18 includes a stator 110 disposed concentrically about a rotor 112 within a generally cylindrical casing 114. Thus, the welding generator 18 includes a plurality of windings, laminations, and circuitry configured to generate electricity as the rotor 112 rotates within the stator 110. The casing 114 includes opposite end portions 116 and 118. The motor mount 33 is disposed on the end portion 116, while the thrust bearing 20 is disposed on the end portion 118. Thus, the motor 16 is coupled to a first end 120 of the rotor 112, while the thrust bearing 120 is coupled to a second end 122 of the rotor 112. In this exemplary embodiment, the thrust bearing 20 is an integral part of the welding generator 18. However, in other embodiments, the thrust bearing 20 may be independent from both the motor 16 and the welding generator 18. For example, the thrust bearing 20 may be mounted below both the motor 16 and the welding generator 18 and configured to support the axially load of the rotor 112. In some embodiments, the thrust bearing 20 also may be configured to support the axial load of other rotating components of the welding generator 18 and/or the motor 16. However, the thrust bearing 20 is generally independent from the motor 16.

The thrust bearing 20 enables the vertical motor-generator configuration 14 by supporting the axial loads that otherwise would not exist in a horizontal configuration of the motor 16 and the welding generator 18. For example, the rotor 112 alone may weigh between 50-60 pounds, and the thrust bearing 20 generally supports the rotor 112 among other components. Again, the thrust bearing 20 is generally independent from the motor 16. As further illustrated in FIG. 4, various components of the welding power supply/controller 26 are contained within the enclosure 24. For example, the controller 26 may include a welding rectifier 124, a reactor 126, and various other components.

Figure 5:
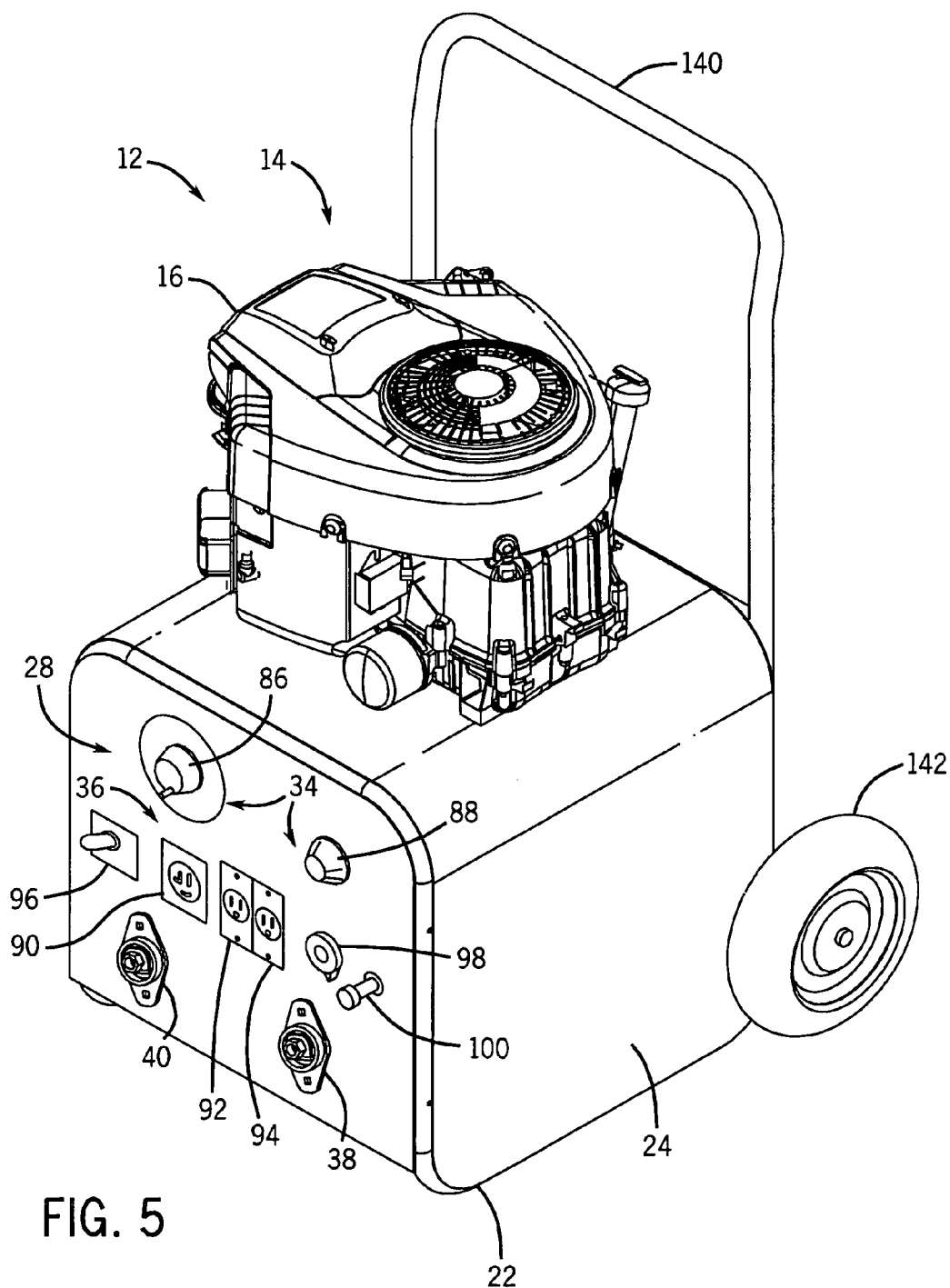
FIG. 5 is an alternative embodiment of the welding generator system of FIG. 1, further illustrating a pair of wheels and a handle coupled to a chassis.

FIG. 5 is a perspective view of an alternative embodiment of the welding generator system 12 of FIG. 1. In this embodiment, the welding generator system 12 includes the enclosure 24 disposed about the welding generator 18, the thrust bearing 20, and the welding power supply/controller 26, while the motor 16 is disposed in the vertical configuration 14 above the enclosure 24. Again, the illustrated welding generator system 12 has the reduced footprint 22 as a result of the vertical configuration 14 rather than a horizontal configuration. In addition, the welding generator system 12 includes a handle 140 and a pair of wheels 142 coupled to the enclosure 24. For example, the illustrated handle 140 is a generally U-shaped structure extending vertically upward from the enclosure 24, while the pair of wheels 24 is disposed in-line with the handle 140 at the footprint 22. Thus, a user may grip the handle 140 and tilt the entire welding generator system 12 at an angle supported on the pair of wheels 142, thereby enabling the user to easily move the system 12 to a desired destination.

Figure 6:
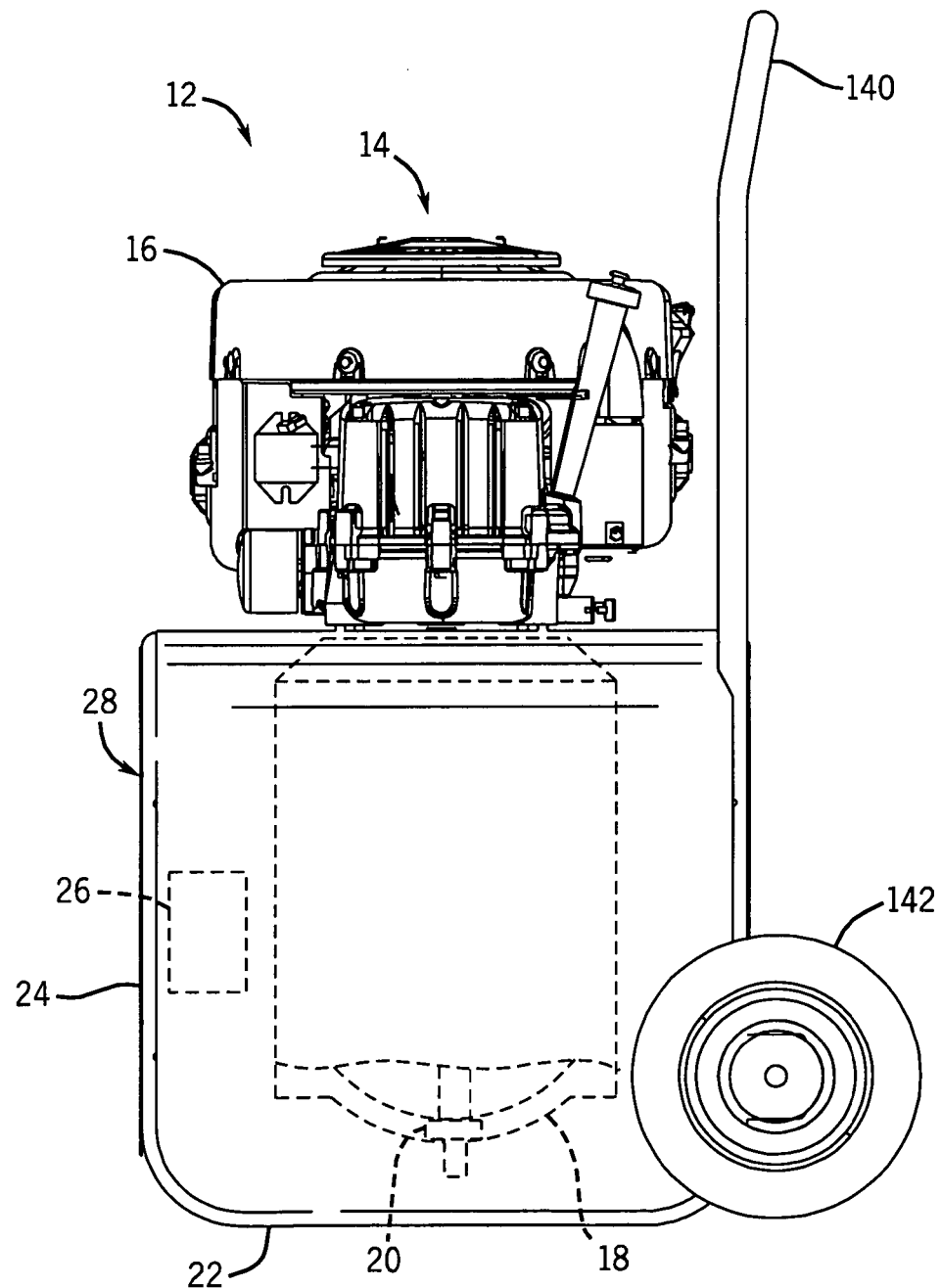
FIG. 6 is a side view of the welding generator system of FIG. 5.

In some embodiments, the handle 140 may be collapsible relative to the enclosure 24. For example, the handle 140 may telescope inwardly and outwardly relative to the enclosure 24 and the pair of wheels 142. Other embodiments include additional wheels, for example, three wheels, four wheels, and so forth. FIG. 6 is a side view of the welding generator system 12 as illustrated in FIG. 5. As illustrated by the dashed lines, the welding generator 18 is disposed within the enclosure 24 directly below the motor 16 in the vertical configuration 14. In addition, the thrust bearing 20 is disposed below the motor 16 and the welding generator 18 to support the axial load of at least the rotor of the motor 16.

While the invention may be susceptible to various modifications and alternative forms, specific embodiments have been shown by way of example in the figures and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A welding generator system, comprising:
   a motor;
   a generator coupled to the motor, wherein the generator comprises a rotor having an axis oriented in a generally upright direction relative to a base portion of the welding generator system;
   a thrust bearing configured to support an axial load of the rotor; and
   a welding power system coupled to the generator.

2. The welding generator system of claim 1, wherein the motor and the generator are disposed one over the other in a generally vertical arrangement relative to the base portion.

3. The welding generator system of claim 1, wherein the thrust bearing is independent from the motor and the generator.

4. The welding generator system of claim 1, wherein the thrust bearing is disposed in the generator.

5. The welding generator system of claim 3, wherein the motor is disposed above the generator and the thrust bearing is disposed generally below the generator.

6. The welding generator system of claim 1, wherein the welding power system comprises a user interface having a welding input and a welding output, and the welding output comprises a welding torch connector and a workpiece connector.

7. The welding generator system of claim 1, comprising a single chassis having the motor, the generator, the thrust bearing, and the welding power system.

8. The welding generator system of claim 7, comprising a telescopic handle and wheels coupled to the single chassis.

9. The welding generator system of claim 1, comprising a welding torch, a welding gas supply, a welding wire feeder, or a transportation system configured to operate with the welding generator system.

10. A welding generator system, comprising:
    a welding power controller;
    a generator coupled to the welding power controller; and
    a thrust bearing coupled to the generator, wherein the thrust bearing is configured to support an axial load of a rotor of the generator.

11. The welding generator system of claim 10, comprising a single chassis having the welding power controller, the generator, the thrust bearing, and a motor mount configured to mount a motor in a generally vertical arrangement with the generator.

12. The welding generator system of claim 11, wherein the thrust bearing and the motor mount are disposed on opposite sides of the generator.

13. The welding generator system of claim 11, comprising the motor coupled to the motor mount independent from the thrust bearing.

14. The welding generator system of claim 11, comprising a wheeled cart having the single chassis, a plurality of wheels coupled to the single chassis, and a telescopic handle configured to provide leverage for a user to rotate the single chassis into an angled position supported by the pair of wheels.

15. A welding generator system, comprising:
a welding generator comprising a stator and a rotor having a rotational axis oriented in a generally upright direction relative to a base portion of the welding generator system;
a drive mount coupled to the welding generator; and
a thrust bearing coupled to the welding generator on an opposite side from the drive mount, wherein the thrust bearing is configured to support an axial load of the rotor.

16. A method for generating welding power, comprising:
supporting via a thrust bearing an axial load of a generator rotor in a generally vertical arrangement of a generator and a drive; and
controlling an output from the generator to provide a welding power.

17. A welding generator system, comprising:
a drive;
a generator coupled to the drive;
a welding power controller coupled to the generator; and
a chassis supporting the drive, the generator, and the welding power controller, wherein the drive and the generator are stacked one over the other relative to a base portion of the chassis; and
a thrust bearing supporting an axial load of a rotor of the generator, wherein the axial load is at least 50 pounds.

18. The welding generator system of claim 17, wherein the drive comprises an internal combustion engine.

19. The welding generator system of claim 10, wherein the thrust bearing is configured to support the axial load of at least 50 pounds.

20. The welding generator system of claim 10, wherein the thrust bearing is independent from the generator and a drive configured rotate the rotor.

21. The welding generator system of claim 15, wherein the thrust bearing is configured to support the axial load of at least 50 pounds.

22. The welding generator system of claim 15, wherein the thrust bearing is independent from the welding generator and a drive configured rotate the rotor.

23. The welding generator system of claim 17, wherein the thrust bearing is independent from the generator and the drive.

* * * * *